Aug. 20, 1940.　　　S. QUISLING　　　2,212,074
CONTAINER
Filed July 31, 1939
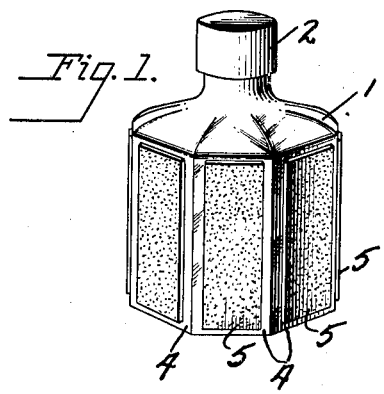
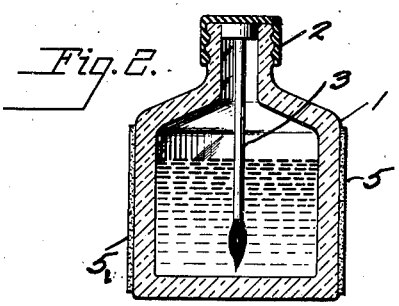
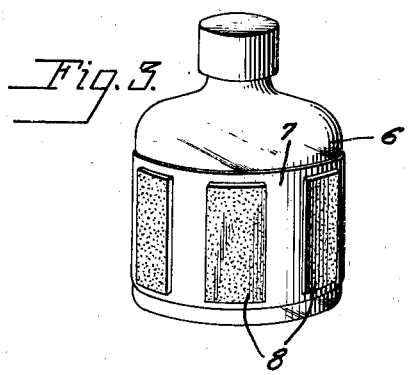
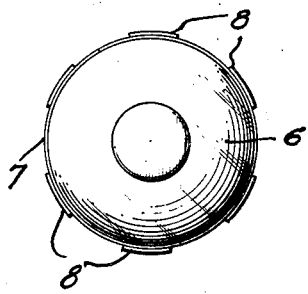
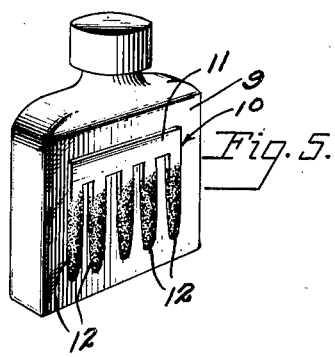
Inventor
Sverre Quisling Patented Aug. 20, 1940

2,212,074

UNITED STATES PATENT OFFICE 2,212,074

CONTAINER

Sverre Quisling, Madison, Wis.

Application July 31, 1939, Serial No. 287,449

4 Claims. (Cl. 91—67.1)

This invention relates to containers for use in applying and removing plastic materials. It has for its purpose the elimination of all but one of a series of containers which were formerly necessary to accomplish what the container of my invention will. This invention has been found to be particularly useful in the application and removal of the plastic materials described in my Patent Number 2,154,822, issued April 18, 1939, and entitled Wax and cellulose ester composition, and the materials described in my copending applications Serial Number 300,021, filed Oct. 18, 1939, and Serial Number 283,648, filed July 10, 1939. However it is not the purpose of this invention to be strictly confined to containers useful only in the cosmetic industry.

Heretofore plastic materials have been dissolved in solvents and sold in containers in the form of lacquers, each container having but one type or colored plastic in each separate container, and a separate container of solvent for removal therefore. By means of my invention a container is adapted to contain a solvent on the inside and one or more types or colored plastics on the outside. As one example of prior art employing lacquers on a large scale, where a large number of separate containers for special types of plastic materials and solvents are used may be cited the cosmetic art employing finger nail polish.

It is one purpose of my invention, in the cosmetic art for example, to employ but one container when desiring to apply or remove one or several types of plastic coatings to or from skin, nails, lips or hair. This was found possible by the use of a container containing a solvent, which container was coated externally by plastic materials in solid form in various types and colors, said plastic materials being soluble in the contained plastic solvent. Thus by using a series of types or colors of plastic materials in divided strips or subdivisions on the outside of such a container, a brush moistened with the solvent material contained therein can be used to take up such coating material and apply it directly to nails, skin, lips, hair, etc., as desired.

These and other objects will become apparent from the following description taken in conjunction with the accompanying drawing, in which:

Fig. 1, is a perspective view of a bottle-like container embodying the features of the invention;

Fig. 2, is a vertical section through that form of container shown in Fig. 1;

Fig. 3, is a perspective view of a modified form of the invention;

Fig. 4, is a top plan view thereof; and,

Fig. 5, is a perspective view of a further modification.

As examples of particular value in the use of the container of my invention may be cited the following. In practice I have found that vinyl acetate containing a suitable pigment is particularly valuable for coating lips and skin due to its elasticity. This material is soluble in alcohol or alcohol containing perfume oils. Thus, for making a most pleasant lip applicator a container having ethyl alcohol and perfume on the inside and vinyl acetate and pigment coating on the outside of said container, forms a most pleasant, beautiful and nicely scented lip coloring means.

In practice, for coloring finger nails, I have found that a container, preferably multi-sided and providing many flat surfaces, proved to be very useful for the application of nail enamel of varying shades. The container held a solvent for such plastic enamel and the cork therefore had the conventional nail brush applicator. Thus, by first moistening the brush with the solvent and then applying it to the sides of said container, the nails could be coated in any desired shade or depth of color all from the same bottle.

Referring to the drawing in detail, and particularly to that form of the invention shown in Figs. 1 and 2, a container 1 of polygonal horizontal cross section is provided with the conventional cap 2 and brush applicator 3. The polygonal shape of the bottle-like container provides a series of rectangular panels 4, to each of which panels is secured a thin cake or coating of plastic material 5. The plastic may be applied to the panels 4 as a heavy coat of enamel-like coating if desired, and each of the panels may carry a different shade of plastic. A solvent for said plastic is carried in the container, for example, to be used first as a polish remover to clean finger nails, for example, of old polish, and then as a moistener for the plastic 5 in applying a fresh coat of coloring to the nails.

A further modification of my invention is the application of the various coatings to a label-like adherent strip before applying said strip to the bottle. This procedure has for its object simplicity of application of the plastic to the container and increased contrast of the plastic to a non-transparent background. Such an arrangement is shown in Figs. 3 and 4 of the drawing, wherein a container 6, preferably round or oval in horizontal section, has a gummed label or flexible strip 7 secured about the lower body portion thereof. One or more cakes or coatings of plastic 8 are spaced along the label. This structure will greatly facilitate placing the plastic on the container. Obviously the plastic cakes or coatings 8 should be placed upon only a portion of the label, leaving space for advertising and/or instructions for use, for example, of the combined plastic and solvent container for nail polish.

A further modification of my invention is the use of a label-like strip made from relatively heavy paper, which label is divided so that portions of it can be torn off and dipped in the solvent, thus eliminating the need of special applicators. Fig. 5 illustrates a container embodying this concept. In this form of the invention the container may be of any convenient configuration, a relatively flat container 9 being shown. Secured to the body portion of the container 9 is a heavy strip 10, quite similar to a match comb used in the so-called book type of match package. This strip 10 consists of a base portion 11 fixed to the container and a number of applicators 12 depending from the base 11. Each of the applicators 12 is coated with plastic material, or may consist entirely of plastic. An applicator 12 when torn from the base portion 11, may be dipped in the solvent within the container 9, and applied directly, sufficient plastic material being carried by each applicator, for example, to completely coat nails, lips, skin, hair, etc., after which operation the applicator may be disposed of, thus permitting absolute sanitation.

A further application of my invention to industry involves the use of medications such as antiseptics, for example iodine in vinyl acetate, or rubefacients, for example capsicum in vinyl acetate, applied to the outside of a container containing a solvent therefore, for example ethyl alcohol. This is of particular value inasmuch as it avoids the danger of spilled medications soiling clothes, etc., for example, when transporting such medications in suitcases, etc.

Other and further applications for the use of my container will readily suggest themselves from the examples given above, and it is not my purpose to limit this invention to the examples and modifications above given since they are given merely for purposes of illustration and not limitation.

Having thus described certain embodiments of my invention, what I claim is:

1. A device of the class described, comprising a container of a bottle-like type coated externally at least on a portion thereof with plastic material soluble in a solvent contained within said container.

2. A device for applying plastic coatings, comprising the combination of a bottle-like container, a plastic coating on the outside of said container, and a solvent for said plastic material within said container.

3. In a device of the type described, a container of bottle-like type containing a solvent, a label-like adherent strip, said strip being divided into segments and having at least one segment coated with a plastic material, said plastic material being soluble in said solvent.

4. In a means for applying plastic coatings comprising a bottle-like container of polygonal shape having a series of rectangular panels coated with plastic material, a solvent for said plastic material in said bottle-like container, and a cork with an applicator attached thereto, extending into said solvent.

SVERRE QUISLING.